(12) United States Patent
Zhang et al.

(10) Patent No.: US 11,454,638 B2
(45) Date of Patent: Sep. 27, 2022

(54) SAMPLE RACK TRANSPORT APPARATUS, SAMPLE ANALYSIS DEVICE, AND SAMPLE ANALYSIS SYSTEM

(71) Applicant: SHENZHEN MINDRAY BIO-MEDICAL ELECTRONICS CO., LTD., Shenzhen (CN)

(72) Inventors: Junwei Zhang, Shenzhen (CN); Changyin Yan, Shenzhen (CN); Changxing Wang, Shenzhen (CN); Xuerong Li, Shenzhen (CN); Yunfei Wang, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 948 days.

(21) Appl. No.: 16/159,991

(22) Filed: Oct. 15, 2018

(65) Prior Publication Data

US 2019/0049476 A1    Feb. 14, 2019

Related U.S. Application Data

(63) Continuation of application No. PCT/CN2016/079507, filed on Apr. 15, 2016.

(51) Int. Cl.
  *G01N 35/04* (2006.01)
  *G01N 35/02* (2006.01)
  *G01N 35/00* (2006.01)

(52) U.S. Cl.
  CPC ..... *G01N 35/026* (2013.01); *G01N 35/00584* (2013.01); *G01N 35/04* (2013.01);
  (Continued)

(58) Field of Classification Search
  CPC ............ G01N 35/026; G01N 35/0099; G01N 2035/0413; G01N 2035/0415;
  (Continued)

(56) References Cited

U.S. PATENT DOCUMENTS

| 5,260,872 A | 11/1993 | Copeland et al. |
| 2013/0195720 A1* | 8/2013 | Behnk ................... G01N 35/04 422/68.1 |
| 2014/0037517 A1* | 2/2014 | Takai ....................... B01L 9/06 422/562 |

FOREIGN PATENT DOCUMENTS

| CN | 103698546 A | 1/2011 |
| CN | 102221624 A | 10/2011 |

(Continued)

*Primary Examiner* — Jill A Warden
*Assistant Examiner* — Dwayne K Handy
(74) *Attorney, Agent, or Firm* — Kory D. Christensen

(57) ABSTRACT

A sample rack transport apparatus for transporting a sample rack to a sample analyser, comprising: a bidirectional transmission track for bidirectionally transmitting a sample rack without passing through the sample analyser; a feed channel in parallel with the bidirectional transmission track, wherein the sample rack may be delivered from the bidirectional transmission track to the feed channel and to the sample analyser; an unloading cache region located between the bidirectional transmission track and the feed channel, the unloading cache region being used for storing the sample tack; and an unloading mechanism for delivering the sample rack in the feed channel to the unloading cache region for storage, or delivering the sample rack stored in the unloading cache region to the bidirectional transmission track. Also provided are a sample analysis device and a sample analysis system using the sample rack transport apparatus.

17 Claims, 5 Drawing Sheets

(52) U.S. Cl.
CPC ......... *G01N 35/00603* (2013.01); *G01N 2035/0415* (2013.01); *G01N 2035/0418* (2013.01); *G01N 2035/0462* (2013.01); *G01N 2035/0465* (2013.01); *G01N 2035/0484* (2013.01)

(58) Field of Classification Search
CPC ... G01N 2035/0418; G01N 2035/0422; G01N 2035/0424; G01N 35/02; G01N 35/04; G01N 2035/403; G01N 2035/405; G01N 2035/412; G01N 2035/465
See application file for complete search history.

(56) References Cited

FOREIGN PATENT DOCUMENTS

| | | |
|---|---|---|
| CN | 103575922 A | 2/2014 |
| CN | 104297508 A | 1/2015 |
| CN | 104569461 A | 4/2015 |
| CN | 204631052 U | 9/2015 |
| CN | 105383894 B | 2/2019 |
| EP | 1 052 513 A1 | 11/2000 |

\* cited by examiner

SAMPLE RACK TRANSPORT APPARATUS, SAMPLE ANALYSIS DEVICE, AND SAMPLE ANALYSIS SYSTEM

CROSS-REFERENCE TO RELATED APPLICATIONS

This application is a continuation of Patent Cooperation Treaty Application No. PCT/CN2016/079507, filed Apr. 15, 2016, for SAMPLE RACK TRANSPORT APPARATUS, SAMPLE ANALYSIS DEVICE, AND SAMPLE ANALYSIS SYSTEM, which is incorporated herein by reference.

TECHNICAL FIELD

The present disclosure relates to medical diagnostic devices, and in particular to a sample rack transport apparatus, a sample analysis device and a sample analysis system.

BACKGROUND

In the field of medical diagnosis, a sample analysis device may be used for detecting properties of various samples, including human blood. The samples are generally loaded on a sample rack and transported via using a flow line to implement flow detection. To improve the transport efficiency of a sample rack and avoid a traffic jam, conventional sample analysis devices may use a plurality of tracks, which may include a forward transfer track, a backward transfer track, and possibly an avoidance track. However, this results in a relatively high equipment cost, as well as an increase in the depth of a flow line, occupying greater space and further increasing costs.

SUMMARY

Disclosed herein is a sample rack transport apparatus, a sample analysis device using the sample rack transport apparatus, and a sample analysis system, which solve the aforementioned problems resulting in a reduction in costs.

A sample rack transport apparatus may be used for transporting a sample rack to a sample analyzer and includes: a bidirectional transfer track for bidirectionally transferring the sample rack without passing through the sample analyzer; a feed channel, in parallel with the bidirectional transfer track, where the sample rack may be capable of being delivered from the bidirectional transfer track to the feed channel and delivered to the sample analyzer; an unloading buffer region located between the bidirectional transfer track and the feed channel, where the unloading buffer region may be used for storing the sample rack; and an unloading mechanism for delivering the sample rack in the feed channel to the unloading buffer region for storage or delivering the sample rack stored in the unloading buffer region to the bidirectional transfer track.

In one embodiment, the apparatus further includes: a loading buffer region located between the bidirectional transfer track and the feed channel, where the loading buffer region may be used for storing the sample rack; and a loading mechanism for delivering the sample rack in the bidirectional transfer track to the loading buffer region for storing the sample rack or delivering the sample rack stored in the loading buffer region to the feed channel. The loading mechanism may be a push rod.

In one embodiment, the apparatus further includes a loading sensor disposed beside the loading buffer region, which may be used for detecting whether the sample rack may be stored in the loading buffer region.

In one embodiment, the unloading mechanism may be disposed below the unloading buffer region, the unloading buffer region includes a panel for supporting the sample rack, an elongated hole may be provided on the panel, and the unloading mechanism includes: a support; a horizontal pushing assembly disposed on the support; a push-claw mounting base linked to the horizontal pushing assembly, where the horizontal pushing assembly can drive the push-claw mounting base to move horizontally; an elevation assembly disposed on the push-claw mounting base; and a push claw disposed on the elevation assembly, where the elevation assembly can drive the push claw to move vertically through the elongated hole; wherein the elevation assembly drives the push claw to rise to enable the push claw to pass through the elongated hole and fit with the bottom of the sample rack, and the horizontal pushing assembly can drive the push-claw mounting base to move horizontally, so as to enable the push claw to drive the sample rack to slide on the panel. The elevation assembly may be embodied as an elevation cylinder.

In one embodiment, the horizontal pushing assembly includes: a horizontal guide rail disposed on the support, where the push-claw mounting base may be slidably disposed on the horizontal guide rail; an electric motor disposed on the support; and a belt linked to the electric motor, where the push-claw mounting base may be connected to the belt, and the electric motor uses the belt to drive the push-claw mounting base to slide on the horizontal guide rail.

In one embodiment, at least two elongated holes are provided on the panel, and the at least two elongated holes are parallel to each other. The push claw may include a main body portion and at least two hook bodies, and the at least two hook bodies may be disposed on the main body portion at an interval. In one embodiment, the elevation assembly drives the push claw to rise, to enable the at least two hook bodies to respectively pass through the at least two elongated holes and fit with the bottom of the sample rack.

In one embodiment, the apparatus further includes an unloading detection mechanism for detecting whether the sample rack may be delivered from the unloading buffer region to the bidirectional transfer track.

In one embodiment, the unloading detection mechanism includes a contact and a detection optocoupler; and the contact has an arc-shaped hook structure, and the contact may be disposed on a side of the bidirectional transfer track and may be rotatable, to enable an end portion of the contact to enter or exit an region above the bidirectional transfer track. The sample rack may be delivered from the unloading buffer region to the bidirectional transfer track and touches the end portion of the contact, and the contact rotates and triggers the detection optocoupler.

In one embodiment, the apparatus further includes an unloading full-load detection sensor. The unloading full-load detection sensor may be directly opposite the end of the unloading buffer region near the bidirectional transfer track and may be used for detecting whether the unloading buffer region may be fully filled with sample racks.

In one embodiment, the apparatus further includes an unloading sensor, where the unloading sensor may be disposed beside the unloading buffer region and may be used for detecting whether the sample rack may be stored in the unloading buffer region.

In one embodiment, the apparatus further includes a sample rack identification mechanism. The sample rack identification mechanism may be disposed on a side of the bidirectional transfer track, and may be directly opposite the end of the bidirectional transfer track near the unloading buffer region. Alternatively, the sample rack identification mechanism may be disposed on a side of the unloading buffer region, and may be directly opposite the end of the unloading buffer region near the bidirectional transfer track.

In one embodiment, the sample rack identification mechanism may be a radio frequency identifier (RFID), a chip recording identity information may be bonded onto the sample rack, and the radio frequency identifier capable of identifying the chip on the sample rack.

In one embodiment, the apparatus further includes a controller, which controls the unloading mechanism to deliver the sample rack in the feed channel to the unloading buffer region for storage. The controller determines or acquires status information about whether the sample rack stored in the unloading buffer region may be delivered to the bidirectional transfer track. When the sample rack may be delivered to the bidirectional transfer track, the unloading mechanism delivers the sample rack to the bidirectional transfer track. Alternatively, when the sample rack cannot be delivered to the bidirectional transfer track, the sample rack is stored in the unloading buffer region.

In one embodiment, the controller determines or acquires status information about whether the unloading buffer region may be not full, and when the unloading buffer region may be not full, controls the unloading mechanism to deliver the sample rack in the feed channel to the unloading buffer region for storage.

A sample analysis device may include the foregoing sample rack transport apparatus and a sample analyzer, where the sample analyzer may be located beside a feed channel, and the sample analyzer draws a sample in the sample rack.

In one embodiment, a sample analysis system includes: a first sample analyzer, a second sample analyzer, a first sample rack transport apparatus, a second sample rack transport apparatus, and a controller. The first sample rack transport apparatus and the second sample rack transport apparatus are adjacently configured to transport a sample rack. In one embodiment, the first sample rack transport apparatus includes: a first bidirectional transfer track for bidirectionally transferring the sample rack without passing through the first sample analyzer; a first feed channel, in parallel with the first bidirectional transfer track, where the sample rack is capable of being delivered from the first bidirectional transfer track to the first feed channel and to the first sample analyzer; a first unloading buffer region located between the first bidirectional transfer track and the first feed channel, where the first unloading buffer region may be used for storing the sample rack; and a first unloading mechanism for delivering the sample rack in the first feed channel to the first unloading buffer region for storing the sample rack or delivering the sample rack stored in the first unloading buffer region to the first bidirectional transfer track. In one embodiment, the second sample rack transport apparatus includes: a second bidirectional transfer track for bidirectionally transferring the sample rack without passing through the second sample analyzer; a second feed channel, in parallel with the second bidirectional transfer track, where the sample rack may be delivered from the second bidirectional transfer track to the second feed channel and to the second sample analyzer; a second unloading buffer region located between the second bidirectional transfer track and the second feed channel, where the second unloading buffer region may be used for storing the sample rack; and a second unloading mechanism for delivering the sample rack in the second feed channel to the second unloading buffer region for storage or delivering the sample rack stored in the second unloading buffer region to the second bidirectional transfer track.

In one embodiment, the first sample rack transport apparatus and the second sample rack transport apparatus are adjacently configured to use the first bidirectional transfer track and the second bidirectional transfer track to transport the sample rack. The controller may determine whether the sample rack located at the first sample transport apparatus needs to be transported to the second feed channel, and when the sample rack needs to be transported to the second feed channel, controls the second sample transport apparatus to transport the sample rack to the second feed channel.

In one embodiment, the sample rack transport apparatus includes the bidirectional transfer track that can bidirectionally transfer a sample rack to replace a plurality of sample rack transfer tracks in a conventional device, so that space occupied by the entire sample rack transport apparatus may be reduced, thereby reducing costs. Moreover, the sample rack transport apparatus further includes the unloading buffer region. A sample rack may be stored in the unloading buffer region. When the bidirectional transfer track may be idle, the sample rack stored in the unloading buffer region may be delivered by the unloading mechanism to the bidirectional transfer track for distribution by the bidirectional transfer track. The unloading buffer region may be disposed, so that a plurality of rows of sample racks can stay at the unloading buffer region at the same time without affecting normal movement of sample racks on the bidirectional transfer track and the feed channel, thereby satisfying the distribution requirements of the sample racks and improving the transport and detection efficiency of the sample racks. Therefore, the sample rack transport apparatus in this application can ensure the transport efficiency of sample racks while simplifying the structure.

DETAILED DESCRIPTION OF EMBODIMENTS

The present disclosure is described more comprehensively below with reference to the accompanying drawings. Various implementations of the present disclosure are provided. However, the present disclosure may be implemented in different ways, and may be not limited to the implementations described herein.

It should be noted that when an element is said to be "fixed" on another element, the element may be directly fixed to the other element or there may be an intermediate element. When one element is said to be "connected" to another element, the element may be directly connected to the other element or there may be an intermediate element. The terms "vertical", "horizontal", "left", "right", and similar expressions used herein are only for illustrative purposes and are not intended to be limiting.

Unless otherwise defined, all technical terms and scientific terms used herein have meanings same as those generally understood by a person skilled in the art of the present disclosure. The terms are used herein in the specification of the present disclosure only for describing specific implementations but are not intended to limit the present disclosure. The term "and/or" used herein includes one or any and all combinations of a plurality of related items.

Figure 1:
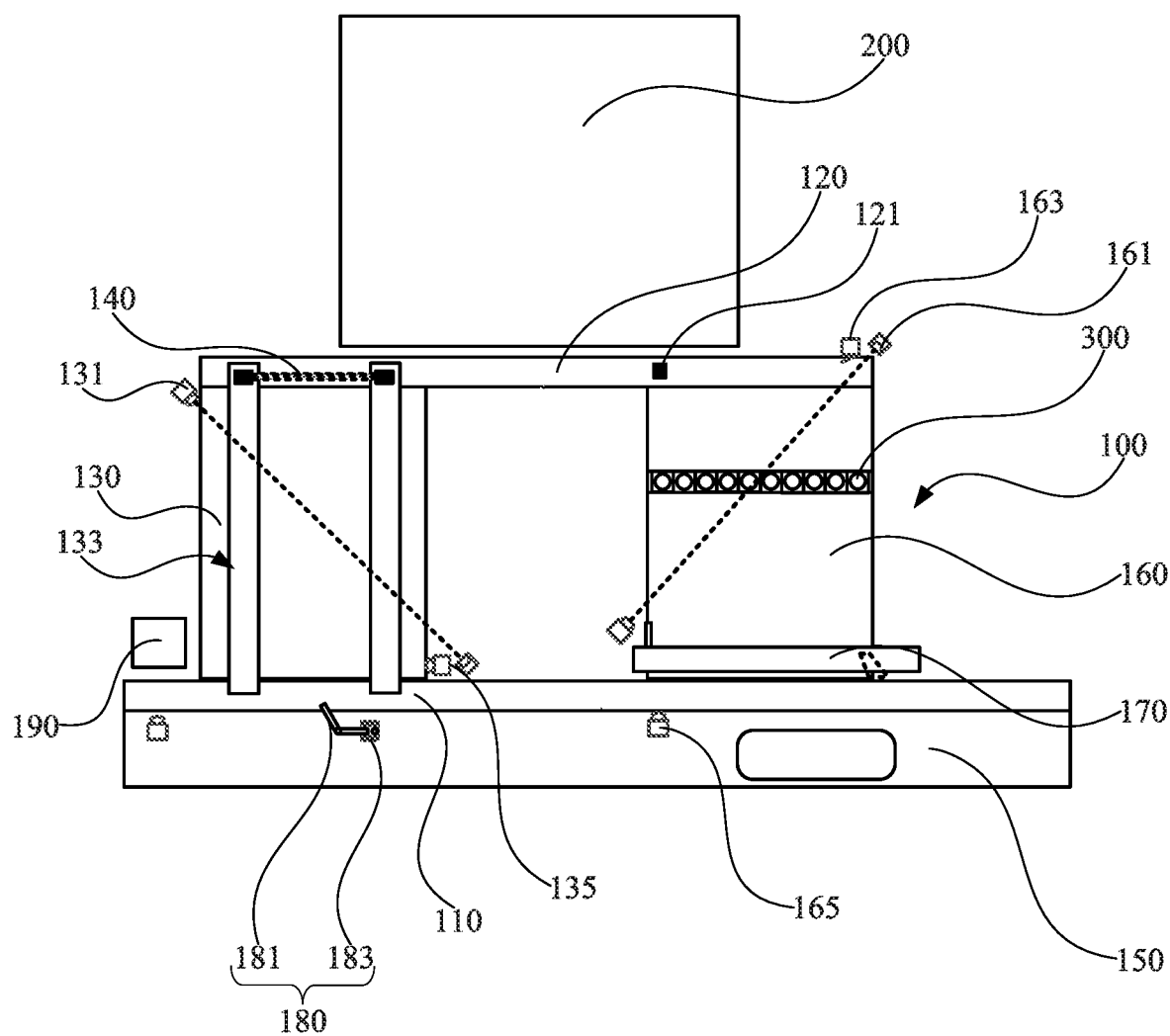
FIG. 1 is a schematic structural diagram of a sample analysis device according to an embodiment of the present disclosure.

Referring to FIG. 1, a sample analysis device 10 may include a sample rack transport apparatus 100 and a sample analyzer 200. A sample that needs to be detected may be loaded in a sample rack 300. The sample rack transport apparatus 100 may be used for delivering the sample rack 300. The sample analyzer 200 may be used for detecting analyzing the sample in the sample rack 300.

Figure 2:
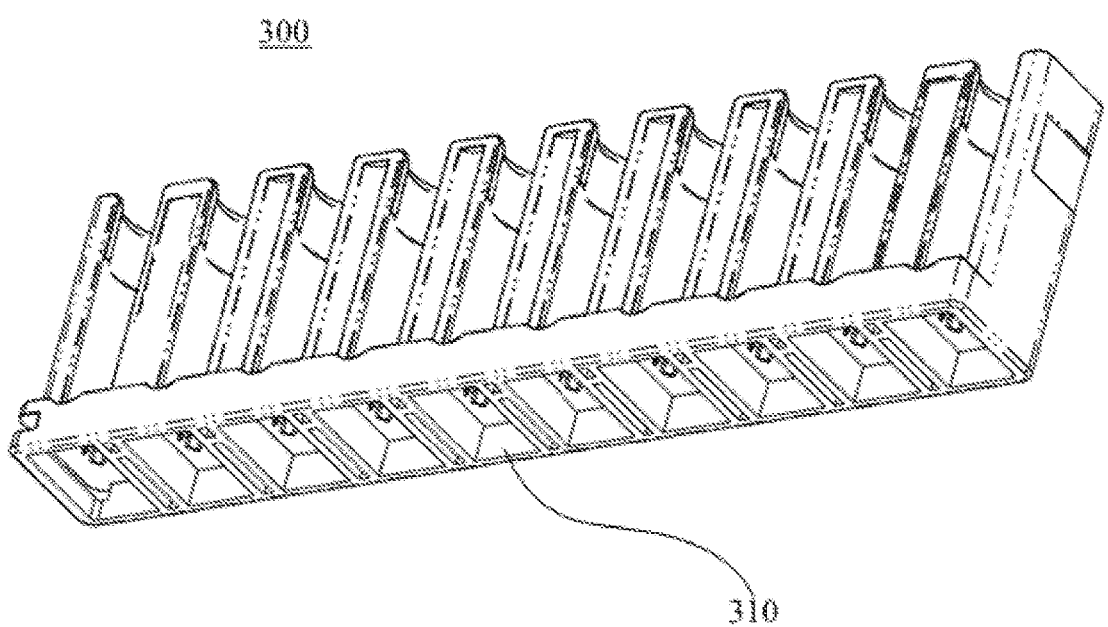
FIG. 2 is a schematic structural diagram of a sample rack.

Referring to FIG. 2, the sample may be loaded in a test tube, and may be loaded on the sample rack 300 by using the test tube. The sample rack 300 may be a test tube rack and has a plurality of test tube positions for loading a plurality of test tubes. The sample may be a blood sample or other body fluid samples such as a sample for blood routine examination, a C-reactive protein (CRP) sample, a smear slide sample, a glycated hemoglobin sample, a urine sample, a cerebrospinal fluid sample, and a pleuroperitoneal fluid sample.

In one embodiment, the sample rack transport apparatus 100 includes a bidirectional transfer track 110, a feed channel 120, an unloading buffer region 130, and an unloading mechanism 140. The bidirectional transfer track 110 may be used for bidirectionally transferring the sample rack 300 without passing through the sample analyzer 200. The sample analysis device 10 may further include a front housing 150. The bidirectional transfer track 110 may be fixed on the front housing 150.

The feed channel 120 may be in parallel with the bidirectional transfer track 110. The sample rack 300 may be delivered from the bidirectional transfer track 110 to the feed channel 120 and delivered to the sample analyzer 200.

A feed mechanism 121 may be disposed on the feed channel 120. The feed mechanism 121 may be used for pushing the sample rack 300 by a distance of one or more intervals between adjacent test tube positions each time. In one embodiment, the feed channel 120 includes a working position directly opposite the sample analyzer 200. When the sample rack 300 may be pushed to the working position, the sample analyzer 200 inserts a sample needle to draw the sample in the test tube. Alternatively, the test tube may be grasped and sent into the analyzer. In this embodiment, the sample analyzer 200 may be an instrument for analyzing a blood sample or other body fluid samples, including but be not limited to, a blood analyzer, a CRP analyzer, a smear slide machine, a glycated hemoglobin analyzer, a slide scanner, a flow cytometer, an immunity analysis apparatus, a coagulation measurement apparatus, a biochemical analysis apparatus, and a urine analysis apparatus.

The unloading buffer region 130 may be located between the bidirectional transfer track 110 and the feed channel 120. The unloading buffer region 130 may be used for storing the sample rack 300. The unloading buffer region 130 can store a plurality of rows of the sample racks 300. The sample rack transport apparatus 100 may further include an unloading sensor 131. The unloading sensor 131 may be located beside the unloading buffer region 130, may be directly opposite the unloading buffer region 130, and may be used for detecting whether the sample rack 300 may be stored in the unloading buffer region 130. When it is detected that the unloading buffer region does not have a test tube rack, the unloading mechanism 140 may be in a stop and standby state.

The unloading mechanism 140 may be used for delivering the sample rack 300 in the feed channel 120 to the unloading buffer region 130 for storage or delivering the sample rack 300 stored in the unloading buffer region 130 to the bidirectional transfer track 110. After detection by the sample analyzer 200, the sample rack 300 may be delivered from the feed channel 120 to the unloading buffer region 130 for storage. When the bidirectional transfer track 110 is idle, the sample rack 300 stored in the unloading buffer region 130 may be delivered by the unloading mechanism 140 to the bidirectional transfer track 110 for distribution by the bidirectional transfer track 110. After the sample rack 300 is delivered to the bidirectional transfer track 110, the bidirectional transfer track 110 may output the sample rack 300 on two sides or deliver the sample rack 300 back to the feed channel 120 for reexamination.

In one embodiment, the sample rack transport apparatus 100 includes the bidirectional transfer track 110 that can bidirectionally transfer the sample rack 300 to replace a plurality of sample rack transfer tracks in a conventional device, so that space occupied by the entire sample rack transport apparatus 100 may be reduced, thereby reducing costs. Moreover, the sample rack transport apparatus 100 further includes the unloading buffer region 130. A sample rack 300 may be stored in the unloading buffer region 130. When the bidirectional transfer track 110 is idle, the sample rack 300 stored in the unloading buffer region 130 may be delivered by the unloading mechanism 140 to the bidirectional transfer track 110 for distribution by the bidirectional transfer track 110. The unloading buffer region 130 may be disposed, so that a plurality of rows of sample racks 300 can stay at the unloading buffer region at the same time 130 without affecting normal movement of sample racks 300 on the bidirectional transfer track 110 and the feed channel 120, thereby satisfying the distribution requirements of the sample racks 300 and improving the transport and detection efficiency of the sample racks 300.

In one embodiment, the sample rack transport apparatus 100 may further include a loading buffer region 160 and a loading mechanism 170. The loading buffer region 160 may be located between the bidirectional transfer track 110 and the feed channel 120. The loading buffer region 160 may be used for storing the sample rack 300. The loading buffer region 160 may store a plurality of rows of sample racks 300.

The loading mechanism 170 may be used for delivering the sample rack 300 in the bidirectional transfer track 110 to the loading buffer region 160 for storage or delivering the sample rack 300 stored in the loading buffer region 160 to the feed channel 120.

The loading mechanism 170 may deliver the sample rack 300 from the bidirectional transfer track 110 to the loading buffer region 160 to wait for a vacancy on the feed channel 120. When a vacancy appears on the feed channel 120, the loading mechanism 170 then delivers the sample rack 300 from the loading buffer region 160 to the feed channel 120.

The loading mechanism 170 may be a push rod. The push rod may be driven by a power mechanism to push the sample rack 300, so as to push the sample rack 300 from the bidirectional transfer track 110 to the loading buffer region 160 for storage, or push the sample rack 300 stored in the loading buffer region 160 to the feed channel 120.

The sample rack transport apparatus 100 may further include a loading sensor 161. The loading sensor 161 may be located beside a loading buffer region, may be directly opposite the loading buffer region 160, and may be used for detecting whether the sample rack 300 may be stored in the loading buffer region 160. When it may be detected the loading buffer region 160 does not have a sample rack, the loading mechanism 170 may be in a standby state.

The sample rack transport apparatus 100 further includes a loading full-load detection sensor (not shown). The loading full-load detection sensor may be located beside the loading buffer region 160 and may be directly opposite the end of the loading buffer region 160 near the feed channel 120 and may be used for detecting whether the loading buffer region 160 may be fully filled with sample racks 300. When the loading buffer region 160 is fully filled with sample racks 300, the loading mechanism 170 stops delivering a sample rack 300 in the feed channel 120 to the loading buffer region 160. In other embodiments, it may be known whether the loading buffer region 160 is full by determining whether a quantity of sample racks 300 that enter the loading buffer region 160 exceeds a preset value.

An optocoupler sensor 165 may be disposed at the end of the bidirectional transfer track 110 near the loading buffer region 160, and may be used for detecting whether the sample rack 300 may be transferred to a position opposite the loading buffer region 160. When the optocoupler sensor 163 detects that the sample rack 300 is in position and there may be still a vacancy on the loading buffer region 160, the loading mechanism 170 may deliver the sample rack 300 to the loading buffer region 160 for storage.

An optocoupler sensor 163 may be also disposed at an end of the feed channel 120 near the loading buffer region 160, and may be used for detecting whether the sample rack 300 may be successfully loaded on the feed channel 120.

The unloading buffer region 130 includes a panel (not shown in the figure) used for supporting the sample rack 300. An elongated hole 133 may be provided on the panel.

Referring again to FIG. 2, a bottom slot 310 may be provided at the bottom of the sample rack 300. A plurality of bottom slots 310 may be provided and are arranged in a length direction of the sample rack 300.

Figure 3:
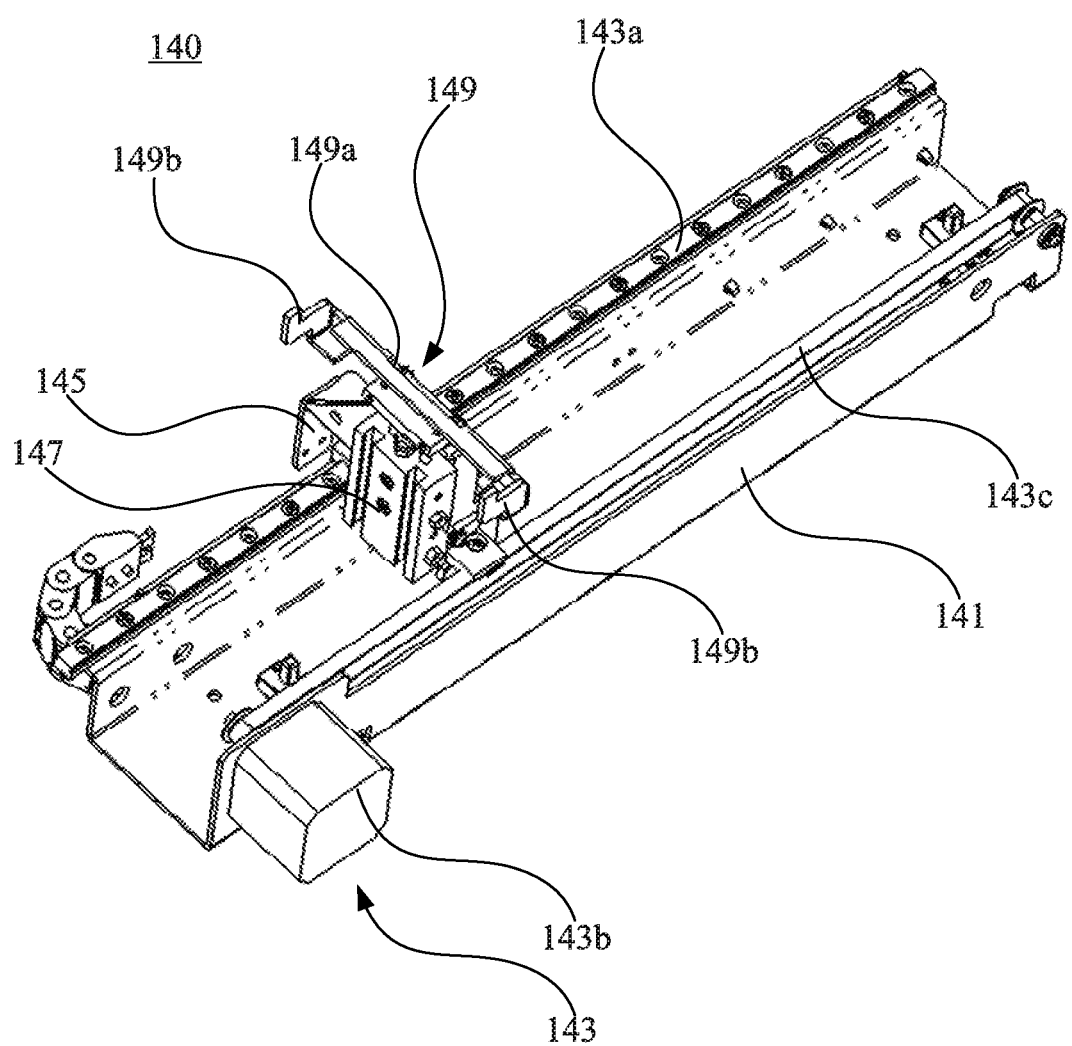
FIG. 3 is a specific structural diagram of an unloading mechanism in the sample analysis device shown in FIG. 1.

Referring also to FIG. 3, the unloading mechanism 140 may be disposed below the unloading buffer region 130. The unloading mechanism 140 includes a support 141, a horizontal pushing assembly 143, a push-claw mounting base 145, an elevation assembly 147, and a push claw 149.

The horizontal pushing assembly 143 may be disposed on the support 141. The push-claw mounting base 145 may be linked to the horizontal pushing assembly 143. The horizontal pushing assembly 143 may drive the push-claw mounting base 145 to move horizontally.

The horizontal pushing assembly 143 includes a horizontal guide rail 143a, an electric motor 143b, and a belt 143c. The horizontal guide rail 143a may be disposed on the support 141. The push-claw mounting base 145 may be slidably disposed on the horizontal guide rail 143a. The electric motor 143b may be disposed on the support 141. The belt 143c may be linked to the electric motor 143b. The push-claw mounting base 145 may be connected to the belt 143c. The electric motor 143b may use the belt 143c to drive the push-claw mounting base 145 to slide on the horizontal guide rail 143a.

The electric motor 143b may be a step motor 143b. Under the control of an external control system, the electric motor 143b performs transmission by using the belt 143c, to enable the sample rack 300 to move by a distance of the width of the sample rack 300 each time.

The elevation assembly 147 may be disposed on the push-claw mounting base 145. The push claw 149 may be disposed on the elevation assembly 147. The elevation assembly 147 may drive elevation of the push claw 149. The push claw 149 may be directly opposite the elongated hole 133. The elevation assembly 147 may be an elevation cylinder. The elevation of a piston rod (not shown in the figure) on the elevation cylinder may be used to drive the elevation of the push claw 149. The elevation assembly may have another structure, for example, a transfer member driven by an electric motor. Any structure that can implement the elevation of the push claw and does not interfere with unloading may be applicable.

The elevation assembly 147 drives the push claw 149 to rise, to enable the push claw 149 to pass through the elongated hole 133 and fit with the bottom of the sample rack 300. The horizontal pushing assembly 143 can drive the push-claw mounting base 145 to move horizontally, so as to enable the push claw 149 to drive the sample rack 300 to slide on the panel. When the push claw 149 drives the sample rack 300 to a specified place, the elevation assembly 147 drives the push claw 149 to drop, to enable the push claw 149 to be separated from the sample rack 300, and the horizontal pushing assembly 143 drives the push-claw mounting base 145 to restore the position.

The push claw 149 may apply a pushing force to a side surface of the sample rack 300 to push the sample rack 300 to move. In addition, the push claw 149 may also be hooked to a slot wall of the bottom slot 310 of the sample rack 300 to pull the sample rack 300 to move.

In one embodiment, two elongated holes 133 are provided on the panel, and the two elongated holes 133 are parallel to each other. The push claw 149 includes a main body portion 149a and two hook bodies 149b, and the two hook bodies 149b are disposed on the main body portion at an interval 149a.

The elevation assembly 147 drives the push claw 149 to rise, to enable the two hook bodies 149b to respectively pass through two elongated holes 133 and fit with the bottom of the sample rack 300.

In operation, the two hook bodies 149b may fit two different positions on the sample rack 300 and drive the sample rack 300 to move, so that a force applied by the unloading mechanism 140 to the sample rack 300 may become more uniform and the stability of the movement of the sample rack 300 may be ensured.

The quantity of the hook bodies 149b need not be limited to 2, and there may further be more than two hook bodies 149b to drive the sample rack 300 more stably to move. A person skilled in the art can understand that only one hook body 149b or another push-claw structure may be disposed on the main body portion 149a of the push claw, and the position of the elongated hole 133 may be correspondingly adjusted. For example, there may be only one elongated hole, provided that the test tube rack 300 may be pushed in the unloading buffer region 130. The test tube racks may be pushed one by one, or a plurality of test tube racks may be pushed together.

The sample rack transport apparatus 100 further includes an unloading full-load detection sensor 135. The unloading full-load detection sensor 135 may be located beside the unloading buffer region 130 and may be directly opposite the end of the unloading buffer region 130 near the bidirectional transfer track 110 and may be used for detecting whether the unloading buffer region 130 may be fully filled with sample racks 300. When the unloading buffer region 130 is fully filled with sample racks 300, the unloading mechanism 140 stops delivering a sample rack 300 in the feed channel 120 to the unloading buffer region 130. In another implementation, it may also be known whether the unloading buffer region 130 is full by determining whether a quantity of sample racks 300 that enter the unloading buffer region 130 exceeds a preset value.

The sample rack transport apparatus 100 may further include an unloading detection mechanism 180 for detecting whether the sample rack 300 may be delivered from the unloading buffer region 130 to the bidirectional transfer track 110.

The unloading detection mechanism 180 includes a contact 181 and a detection optocoupler 183. The contact 181 may be an arc-shaped hook structure. The contact 181 may be disposed on a side of the bidirectional transfer track 110 and may be rotatable, to enable an end portion of the contact 181 to enter or exit a region above the bidirectional transfer track 110.

The sample rack 300 may be delivered from the unloading buffer region 130 to the bidirectional transfer track 110 and touches the end portion of the contact 181. The contact 181 rotates and triggers the detection optocoupler 183. When the contact 181 triggers the detection optocoupler 183, the detection optocoupler 183 may send a signal indicating that the sample rack 300 may be in position.

When the bidirectional transfer track 110 transfers the sample rack 300, the contact 181 rotates to leave the region above the bidirectional transfer track 110 to prevent normal working of the bidirectional transfer track 110 from being affected.

It should be noted that when the unloading mechanism 140 delivers a plurality of rows of sample racks 300 to the bidirectional transfer track 110, because a plurality of rows of sample racks 300 press each other, pressure may exist between elements such as the sample rack 300 in the first row and the side wall on the bidirectional transfer track 110 and further generates a force of friction. As a result, the bidirectional transfer track 110 may fail to smoothly take away the sample rack 300 in the first row, and the scheduling of the entire sample rack transport apparatus 100 may further be affected.

To resolve the foregoing problem, when the unloading detection mechanism 180 detects that the sample rack 300 in the first row may be in position on the bidirectional transfer track 110, the push claw 149 drops and returns to the bottom of the sample rack 300 in the second row. After the push claw 149 reaches the bottom of the sample rack 300, the push claw 149 rises to be hooked to a slot wall of the bottom slot 310 of the sample rack 300 in the second row, and pulls the sample racks 300 in the second and subsequent rows to movement backward, so as to enable the sample rack 300 in the first row to be separated from the other sample racks 300 to eliminate the pressure applied to the sample rack 300 in the first row.

In addition, a plurality of rows of sample racks 300 may be stored in the unloading buffer region 130. Therefore, during operation, one of the sample racks 300 may be manually removed. For example, if there are originally five sample racks 300 for detection, the sample rack 300 in the third row may be manually removed. The control system may consider the sample rack 300 that may be originally in the fourth row as the sample rack 300 in the third row. As a result, during subsequent scheduling, the sample rack 300 in the fourth row may be scheduled to an incorrect place, further causing problems that sample examination results are missing or reexamination may be not performed. Moreover, to avoid mistakes, once discovering that the quantity of sample racks 300 in the unloading buffer region 130 does not match expectation, the control system stops delivering a sample rack 300, and the delivery efficiency of the entire sample rack transport apparatus 100 may be affected.

To resolve the foregoing problem, the sample rack transport apparatus 100 may further include a sample rack identification mechanism 190. The sample rack identification mechanism 190 may be disposed on a side of the bidirectional transfer track 110, and may be directly opposite the end of the bidirectional transfer track 110 near the unloading buffer region 130. Alternatively, in another embodiment, the sample rack identification mechanism 190 may be disposed on a side of the unloading buffer region 130, and may be directly opposite the end of the unloading buffer region 130 near the bidirectional transfer track 110.

The sample rack identification mechanism 190 may identify identity information of the sample rack 300 to further know which sample rack 300 may be removed, so as to avoid incorrect delivery of a sample rack 300, thereby improving the delivery efficiency of the sample rack transport apparatus 100.

In one embodiment, the sample rack identification mechanism 190 may be a radio frequency identifier (RFID). A chip recording identity information (not shown) may be bonded to each sample rack 300. The radio frequency identifier can recognize a chip on the sample rack 300.

It may be understood that in another embodiment, the sample rack identification mechanism 190 may alternatively be a barcode scanner. A barcode recording identity information may be bonded onto the sample rack 300. The barcode scanner may be used to recognize the barcode on the sample rack 300. Alternatively, the sample rack 300 may further be recognized in another manner, and the identification may be not limited to the foregoing manner.

In the sample analysis device 10 and the sample rack transport apparatus 100 of the sample analysis device 10, only a single bidirectional transfer track 110 may be used to replace a plurality of sample rack transfer tracks in a conventional device. Therefore, it may be more challenging to ensure the scheduling efficiency in a structure that has a single bidirectional transfer track 110 than in a structure that has a plurality of sample rack transfer tracks.

Figure 4:
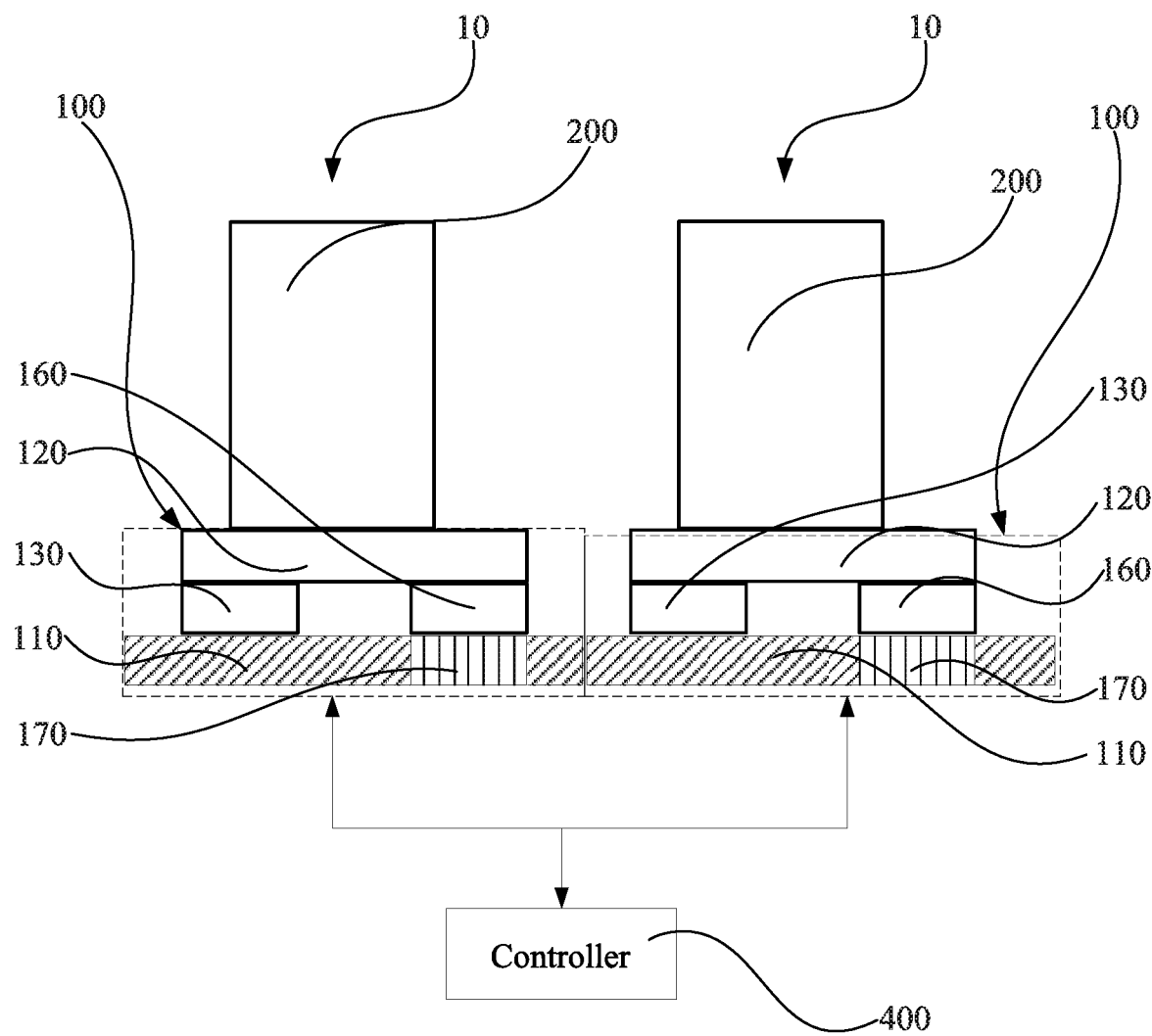
FIG. 4 is a schematic structural diagram of two sample analysis devices shown in FIG. 1 being connected.

In operation, as shown in FIG. 4, the bidirectional transfer track 110 may be occupied in the following eight scenarios, which are respectively:

A transport path 1 of the sample rack 300: [Bidirectional passthrough]

Entry from the right side in the figure→the bidirectional transfer track 110→output from the left side in the figure.

A transport path 2 of the sample rack 300: [Passthrough to the right side in the figure]

Entry from the left side in the figure→the bidirectional transfer track 110→output from the right side in the figure.

A transport path 3 of the sample rack 300: [Loading and unloading on different sides, entry into examination, and output after examination may be completed]

Entry from the right side in the figure→the loading mechanism 170→the loading buffer region 160→the feed channel 120→the unloading buffer region 130→the bidirectional transfer track 110→output from the left side in the figure.

A transport path 4 of the sample rack 300: [Loading and unloading on the same side, entry into examination, and output after examination may be completed]

Entry from the right side in the figure→the loading mechanism 170→the loading buffer region 160→the feed channel 120→the unloading buffer region 130→the bidirectional transfer track 110→output from the right side in the figure.

A transport path 5 of the sample rack 300: [Loading and unloading on different sides, reexamination on a current apparatus]

Entry from the right side in the figure→the loading mechanism 170→the loading buffer region 160→the feed channel 120→the unloading buffer region 130→the bidirectional transfer track 110→the loading mechanism 170→the loading buffer region 160→the feed channel 120→the unloading buffer region 130→the bidirectional transfer track 110→output from the left side in the figure.

A transport path 6 of the sample rack 300: [Loading and unloading on different sides, reexamination on a current apparatus]

Entry from the right side in the figure→the loading mechanism 170→the loading buffer region 160→the feed channel 120→the unloading buffer region 130→the bidirectional transfer track 110→the loading mechanism 170→the loading buffer region 160→the feed channel 120→the unloading buffer region 130→the bidirectional transfer track 110→output from the right side in the figure.

A transport path 7 of the sample rack 300: [Reexamination on a different apparatus]

The loading mechanism 170→the loading buffer region 160→the feed channel 120→the unloading buffer region 130→the bidirectional transfer track 110→the loading mechanism 170 in another sample analysis device 10→the loading buffer region 160 in the another sample analysis device 10→the feed channel 120 in the another sample analysis device 10→the unloading buffer region 130 in the another sample analysis device 10→the bidirectional transfer track 110 in the another sample analysis device 10→output from the left side in the figure.

A transport path 8 of the sample rack 300: [Reexamination on a different apparatus]

The loading mechanism 170 in another sample analysis device 10→the loading buffer region 160 in another sample analysis device 10→the feed channel 120 in the another sample analysis device 10→the unloading buffer region 130 in the another sample analysis device 10→the bidirectional transfer track 110 in the another sample analysis device 10→the loading mechanism 170→the loading buffer region 160→the feed channel 120→the unloading buffer region 130→the bidirectional transfer track 110→output from the right side in the figure.

Figure 5:
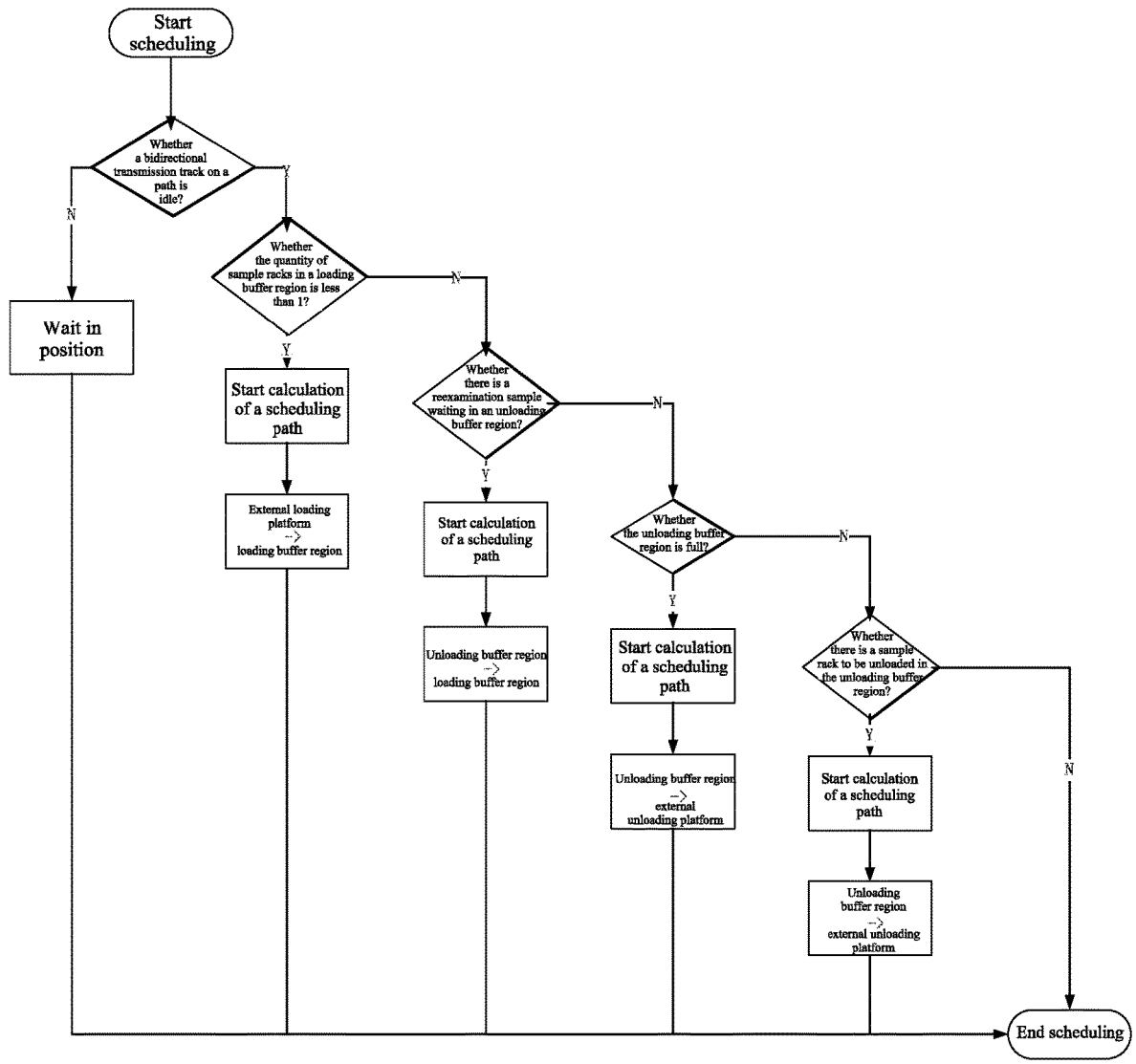
FIG. 5 is a flow chart of a priority arrangement when a sample analysis device performs transfer tasks.

Referring to FIG. 5, because a single bidirectional transfer track 110 bears the transfer task of the foregoing plurality of sample racks 300, to ensure delivery efficiency, a time-division multiplexing technique may be used, and priorities are arranged according to a transfer task:

1. No speed reduction: A quantity of sample racks 300 on the loading buffer region 160 may be preferentially ensured to satisfy continuous operation of the detection of sample racks 300 by the sample analyzer 200.

2. Reexamination samples: Reexamination samples including a sample for blood routine examination, a CRP sample, a smear slide sample, a glycated hemoglobin sample, and the like may be preferentially scheduled.

3. Full unloading buffer region 130: The detection speed may be affected when the unloading buffer region 130 may be full. A sample rack 300 in the unloading buffer region 130 may be preferentially transferred to an external unloading platform (not shown).

4. Sample unloading: A sample rack 300 to be unloaded may be preferentially transferred from the unloading buffer region 130 to an external unloading platform.

During scheduling, by using path calculation, scheduling may be performed according to the foregoing priorities and the load of an entire sample analysis device 10. In the foregoing scheduling method, when a path may be occupied, a sample rack 300 that needs to be scheduled temporarily stops in the unloading buffer region to wait for resources. Region segmentation may be used for path calculation to increase the use efficiency of the bidirectional transfer track 110.

The sample rack transport apparatus in this application 100 further includes a controller 400. The controller 400 may communicate with and be connected to other members of the sample rack transport apparatus 100 to control the movement of members such as the bidirectional transfer track 110, the feed mechanism 121, the unloading mechanism 140, and the loading mechanism 170. The sample in the sample rack 300 may be drawn and then transferred to an end of the feed channel 120. When the information that may be about the unloading full-load detection sensor 135 and may be acquired by the controller 400 may be that the unloading buffer region 130 may be not full, the controller 400 controls the unloading mechanism 140 to transport the sample rack 300 to the unloading buffer region 130 for storage. The controller 400 determines or acquires whether the current sample rack 300 may be delivered to the bidirectional transfer track 110. The current sample rack 300 means a sample rack 300 that may be closest to the bidirectional transfer track 110 in the unloading buffer region 130.

When the current sample rack 300 may be delivered to the bidirectional transfer track 110, the controller 400 has already adjusted the movement direction of the bidirectional transfer track 100 to be a direction in which the current sample rack 300 may be delivered to a destination of the current sample rack 300, and controls the unloading mechanism 140 to deliver the current sample rack 300 to the bidirectional transfer track 110. The unloading buffer region 130 may buffer a plurality of sample racks 300. The entry of a sample rack 300 into the unloading buffer region 130 and the delivery of the sample rack 300 out from unloading buffer region 130 are not continuous. A sample rack 300 generally needs to wait in the unloading buffer region 130 for the controller 400 to determine whether the current sample rack 300 may be delivered to the bidirectional transfer track 110.

The unloading mechanism 140 may be disposed below the panel used for supporting the sample rack 300 in the unloading buffer region 130, and the unloading mechanism 140 does not interfere with the sample rack 300 during movement. Therefore, a sample rack 300 from which a sample has been drawn in the feed channel 120 may be delivered to the unloading buffer region 130 provided that an unloading region in this application may be not full. Meanwhile, provided that the bidirectional transfer track 110 can accommodate a sample rack 300 in the unloading buffer region 130, even if a sample rack 300 in the feed channel 120 may be still in a sample drawing state, the unloading mechanism 140 can deliver a sample rack 300 to the bidirectional transfer track 110 in real time, thereby improving the scheduling efficiency.

In addition, the controller 400 may further determine or acquire status information about whether the unloading buffer region 130 is not full, and when determining or acquiring that the unloading buffer region 130 is not full, controls the unloading mechanism 140 to deliver the sample rack 300 in the feed channel 120 to the unloading buffer region 130 for storage, until the controller 400 determines or acquires that the unloading buffer region 130 may be full.

According to another aspect, a sample analysis system is disclosed. In one embodiment, the sample analysis system includes a first sample analyzer 200, a second sample analyzer 200, a first sample rack transport apparatus 100, a second sample rack transport apparatus 100, and a controller 400.

The first sample rack transport apparatus 100 and the second sample rack transport apparatus 100 are adjacently configured to transport a sample rack 300.

The first sample rack transport apparatus 100 includes: a first bidirectional transfer track 110 for bidirectionally transferring the sample rack 300 without passing through the first sample analyzer 200; a first feed channel 120, in parallel with the first bidirectional transfer track 110, where the sample rack 300 may be delivered from the first bidirectional transfer track 110 to the first feed channel 120 and delivered to the first sample analyzer 200; a first unloading buffer region 130 located between the first bidirectional transfer track 110 and the first feed channel 120, where the first unloading buffer region 130 may be used for storing the sample rack 300; and a first unloading mechanism 140 for delivering the sample rack 300 in the first feed channel 120 to the first unloading buffer region 130 for storage or delivering the sample rack 300 stored in the first unloading buffer region 130 to the first bidirectional transfer track 110.

The second sample rack transport apparatus 100 includes: a second bidirectional transfer track 110 for bidirectionally transferring the sample rack 300 without passing through the second sample analyzer 200; a second feed channel 120, in parallel with the second bidirectional transfer track 110, where the sample rack 300 may be delivered from the second bidirectional transfer track 110 to the second feed channel 120 and delivered to the second sample analyzer 200; a second unloading buffer region 130 located between the second bidirectional transfer track 110 and the second feed channel 120, where the second unloading buffer region 130 may be used for storing the sample rack 300; and a second unloading mechanism 140 used for delivering the sample rack 300 in the second feed channel 120 to the second unloading buffer region 130 for storage or delivering the sample rack 300 stored in the second unloading buffer region 130 to the second bidirectional transfer track 110.

In one embodiment, the first sample rack transport apparatus 100 and the second sample rack transport apparatus 100 are adjacently configured by using the first bidirectional transfer track 110 and the second bidirectional transfer track to transport the sample rack 300.

The controller 400 may determine whether the sample rack 300 located at the first sample transport apparatus needs to be transported to the second feed channel 120, and when the sample rack 300 needs to be transported to the second feed channel 120, controls the second sample transport apparatus to transport the sample rack 300 to the second feed channel 120.

In the sample analysis system, the foregoing more than two sample rack transport apparatuses 100 are adjacently configured by using a bidirectional transport track, so that sample racks 300 may be transported among more than two sample analyzers 200, so as to perform flow-line work of a plurality of sample analyzers 200 and implement the automation of sample analysis and examination.

The sample rack transport apparatus 100 includes the bidirectional transfer track 110 that can bidirectionally transfer the sample rack 300 to replace a plurality of sample rack transfer tracks in a conventional device, so that space occupied by the entire sample rack transport apparatus 100 may be reduced, thereby reducing costs. Moreover, the sample rack transport apparatus 100 further includes the unloading buffer region 130. A sample rack 300 may be stored in the unloading buffer region 130. When the bidirectional transfer track 110 may be idle, the sample rack 300 stored in the unloading buffer region 130 may be delivered by the unloading mechanism 140 to the bidirectional transfer track 110 for distribution by the bidirectional transfer track 110. The unloading buffer region 130 may be disposed, so that a plurality of rows of sample racks 300 can stay at the unloading buffer region at the same time 130 without affecting normal movement of sample racks 300 on the bidirectional transfer track 110 and the feed channel 120, thereby satisfying the distribution requirements of the sample racks 300 and improving the transport and detection efficiency of the sample racks 300. Therefore, the sample rack transport apparatus in this application 100 can ensure the transport efficiency of sample racks 300 while simplifying the structure.

The technical features in the foregoing embodiments may be combined in various embodiments. For ease of description, all possible combinations of the technical features in the foregoing embodiments are not described. However, provided that these combinations of the technical features do not conflict with each other, the combinations should be construed as falling within the scope of the disclosure.

The above-mentioned examples merely represent several embodiments of the present disclosure, giving specifics and details thereof, but should not be understood as limiting the scope of the present patent of disclosure thereby. It should be noted that a person of ordinary skill in the art could also make some alterations and improvements without departing from the spirit of the present disclosure and these would all fall within the scope of protection of the present disclosure. Therefore, the scope of protection shall be in accordance with the appended claims.

The invention claimed is:

1. A sample rack transport apparatus for transporting a sample rack to a sample analyzer, comprising:
    a bidirectional transfer track configured to bidirectionally transfer the sample rack without passing through the sample analyzer;
    a feed channel in parallel with the bidirectional transfer track and arranged opposite to the bidirectional transfer track along a direction perpendicular to an extending direction of the bidirectional transfer track, wherein the sample rack is capable of being delivered from the bidirectional transfer track to the feed channel and to the sample analyzer;
    an unloading buffer region located between the bidirectional transfer track and the feed channel, wherein the unloading buffer region is configured to store the sample rack;
    an unloading mechanism configured to deliver the sample rack in the feed channel to the unloading buffer region for storing the sample rack or deliver the sample rack stored in the unloading buffer region to the bidirectional transfer track;
    a loading buffer region located between the bidirectional transfer track and the feed channel, wherein the loading buffer region is configured to store the sample rack; and a loading mechanism configured to deliver the sample rack to be reexamined delivered from the unloading buffer region to the bidirectional transfer track to the feed channel;

wherein the unloading buffer region is arranged separately from the loading buffer region, and the unloading buffer region, the bidirectional transfer track and the loading buffer region form a U-shaped structure.

2. The sample rack transport apparatus of claim 1, wherein the loading mechanism is a push rod.

3. The sample rack transport apparatus of claim 1, further comprising a loading sensor, wherein the loading sensor is disposed beside the loading buffer region and is configured to detect whether the sample rack is stored in the loading buffer region.

4. The sample rack transport apparatus of claim 1, wherein the unloading mechanism is disposed below the unloading buffer region, the unloading buffer region comprises a panel configured to support the sample rack, an elongated hole is provided on the panel, and the unloading mechanism comprises:

a support;

a horizontal pushing assembly disposed on the support;

a push-claw mounting base linked to the horizontal pushing assembly, wherein the horizontal pushing assembly is configured to drive the push-claw mounting base to move horizontally;

an elevation assembly disposed on the push-claw mounting base; and a push claw disposed on the elevation assembly, wherein the elevation assembly is configured to drive the push claw to move vertically through the elongated hole; wherein the elevation assembly is configured to drives the push claw to rise to enable the push claw to pass through the elongated hole and fit with the bottom of the sample rack, and the horizontal pushing assembly is configured to drive the push-claw mounting base to move horizontally, so as to enable the push claw to drive the sample rack to slide on the panel.

5. The sample rack transport apparatus of claim 4, wherein the horizontal pushing assembly comprises:

a horizontal guide rail disposed on the support, wherein the push-claw mounting base is slidably disposed on the horizontal guide rail;

an electric motor disposed on the support; and a belt linked to the electric motor, wherein the push-claw mounting base is connected to the belt, and the electric motor is configured to use the belt to drive the push-claw mounting base to slide on the horizontal guide rail.

6. The sample rack transport apparatus of claim 4, wherein the elevation assembly is an elevation cylinder.

7. The sample rack transport apparatus of claim 4, wherein at least two elongated holes are provided on the panel, and the at least two elongated holes are parallel to each other; the push claw comprises a main body portion and at least two hook bodies, and the at least two hook bodies are disposed on the main body portion at an interval; and the elevation assembly is configured to drive the push claw to rise to enable the at least two hook bodies to respectively pass through the at least two elongated holes and fit with the bottom of the sample rack.

8. The sample rack transport apparatus of claim 1, further comprising an unloading detection mechanism configured to detect whether the sample rack is delivered from the unloading buffer region to the bidirectional transfer track.

9. The sample rack transport apparatus of claim 8, wherein the unloading detection mechanism comprises a contact and a detection optocoupler; and the contact has an arc-shaped hook structure, and the contact is disposed on a side of the bidirectional transfer track and is rotatable to enable an end portion of the contact to enter or exit an area above the bidirectional transfer track; wherein the sample rack is delivered from the unloading buffer region to the bidirectional transfer track and touches the end portion of the contact, and the contact rotates and triggers the detection optocoupler.

10. The sample rack transport apparatus of claim 1, further comprising an unloading full-load detection sensor, wherein the unloading full-load detection sensor is directly opposite the end of the unloading buffer region near the bidirectional transfer track and is configured to detect whether the unloading buffer region is fully filled with sample racks.

11. The sample rack transport apparatus of claim 1, further comprising an unloading sensor, wherein the unloading sensor is disposed beside the unloading buffer region and is configured to detect whether the sample rack is stored in the unloading buffer region.

12. The sample rack transport apparatus of claim 1, further comprising a sample rack identification mechanism; wherein the sample rack identification mechanism is disposed on a side of the bidirectional transfer track, and is directly opposite the end of the bidirectional transfer track near the unloading buffer region; or the sample rack identification mechanism is disposed on one side of the unloading buffer region, and is directly opposite the end of the unloading buffer region near the bidirectional transfer track.

13. The sample rack transport apparatus of claim 12, wherein the sample rack identification mechanism is a radio frequency identifier, a chip recording identity information is bonded onto the sample rack, and the radio frequency identifier is configured to identify the chip on the sample rack.

14. The sample rack transport apparatus of claim 1, wherein:

the unloading mechanism is configured to deliver the sample rack in the feed channel to the unloading buffer region for storage; and the unloading mechanism is configured to deliver the sample rack to the bidirectional transfer track when the sample rack in the unloading buffer region may be delivered to the bidirectional transfer track or to store the sample rack in the unloading buffer region when the sample rack in the unloading buffer region cannot be delivered to the bidirectional transfer track.

15. The sample rack transport apparatus of claim 1, further comprising a controller, wherein the controller is configured to determine or acquire status information about whether the unloading buffer region is not full, and when the unloading buffer region is not full, control the unloading mechanism to deliver the sample rack in the feed channel to the unloading buffer region for storage.

16. A sample analysis device, comprising the sample rack transport apparatus of claim 1 and a sample analyzer, wherein the sample analyzer is located beside the feed channel, and the sample analyzer is configured to draw a sample in the sample rack.

17. A sample analysis system, comprising:

a first sample analyzer, a second sample analyzer, a first sample rack transport apparatus, and a second sample rack transport apparatus; wherein the first sample rack transport apparatus and the second sample rack transport apparatus are adjacently configured to transport a sample rack;

the first sample rack transport apparatus comprises:

a first bidirectional transfer track configured to bidirectionally transfer the sample rack without passing through the first sample analyzer;

a first feed channel, in parallel with the first bidirectional transfer track and arranged opposite to the bidirectional transfer track along a direction perpendicular to an extending direction of the bidirectional transfer track, wherein the sample rack is capable of being delivered from the first bidirectional transfer track to the first feed channel and to the first sample analyzer;

a first unloading buffer region located between the first bidirectional transfer track and the first feed channel, wherein the first unloading buffer region is configured to store the sample rack;

a first unloading mechanism configured to deliver the sample rack in the first feed channel to the first unloading buffer region for storing the sample rack or deliver the sample rack stored in the first unloading buffer region to the first bidirectional transfer track;

a first loading buffer region located between the first bidirectional transfer track and the first feed channel, wherein the first loading buffer region is configured to store the sample rack; and a first loading mechanism configured to deliver the sample rack to the first loading buffer region for storing the sample rack or deliver the sample rack stored in the first loading buffer region to the feed channel;

wherein the first unloading buffer region is arranged separately from the first loading buffer region, and the first unloading buffer region, the first bidirectional transfer track and the first loading buffer region form a U-shaped structure; and the second sample rack transport apparatus comprises:

a second bidirectional transfer track configured to bidirectionally transfer the sample rack without passing through the second sample analyzer;

a second feed channel, in parallel with the second bidirectional transfer track, wherein the sample rack is capable of being delivered from the second bidirectional transfer track to the second feed channel and to the second sample analyzer;

a second unloading buffer region located between the second bidirectional transfer track and the second feed channel, wherein the second unloading buffer region is configured to store the sample rack;

a second unloading mechanism configured to deliver the sample rack in the second feed channel to the second unloading buffer region for storage or deliver the sample rack stored in the second unloading buffer region to the second bidirectional transfer track;

a second loading buffer region located between the second bidirectional transfer track and the second feed channel, wherein the second loading buffer region is configured to store the sample rack; and a second loading mechanism configured to deliver the sample rack to the second loading buffer region for storing the sample rack or deliver the sample rack stored in the second loading buffer region to the second feed channel; wherein the second unloading buffer region is arranged separately from the second loading buffer region, and the second unloading buffer region, the second bidirectional transfer track and the second loading buffer region form a U-shaped structure; and the first sample rack transport apparatus and the second sample rack transport apparatus are adjacently configured to use the first bidirectional transfer track and the second bidirectional transfer track to transport the sample rack.

* * * * *